Nov. 1, 1966  R. G. POLLITZER ETAL  3,281,889
METHOD AND APPARATUS FOR DEHEADING SHRIMP
Filed July 31, 1964

INVENTORS.
RICHARD G. POLLITZER
WALTER D. TOLER
BY
Kemon, Palmer, Stewart & Estabrook
ATTORNEYS.

INVENTORS.
RICHARD G. POLLITZER
WALTER D. TOLER
ATTORNEYS.

United States Patent Office 3,281,889
Patented Nov. 1, 1966

3,281,889
METHOD AND APPARATUS FOR DEHEADING SHRIMP
Richard G. Pollitzer, Beaufort, and Walter D. Toler, Mount Pleasant, S.C., assignors, by mesne assignments, to Sea Mach Co., Jacksonville, Fla., a corporation of Florida
Filed July 31, 1964, Ser. No. 388,975
19 Claims. (Cl. 17—2)

This application is a continuation-in-part of our copending application, Serial No. 226,228, filed September 26, 1962, entitled "Method and Apparatus for Deheading Shrimp" and now abandoned.

This invention relates broadly to the deheading of shrimp and more particularly to an improved apparatus and method for removing the heads of the shrimp without mutilating the bodies thereof.

The deheading of shrimp has always presented a problem in the fish processing industry and over the years numerous machines have been devised for the purpose of replacing the conventional mode of deheading shrimp by hand. The deheading of shrimp by such machines has not solved the problem regarding the mutilation of the shrimp bodies as a substantial portion of the shrimp that are fed into such machines become entangled in the mechanism thereof and are mutilated. Such a condition renders the shrimp unmarketable resulting in such a loss of revenue that shrimp are still being deheaded by hand rather than by machine.

The present invention is directed to a method and apparatus for the deheading of shrimp wherein the heads of the shrimp are effectively removed while substantially eliminating the mutilation of the shrimp bodies. The reduction in mutilated shrimp bodies through the use of the apparatus of the present invention greatly increases the desirability of using a machine to replace the conventional hand deheading operation. In addition, the use of such apparatus results in the processing of a large volume of shrimp at a cost that is less than that incurred through a hand or manual deheading operation.

One of the objects of the present invention is to provide an apparatus for the deheading of shrimp which efficiently and effectively removes the heads from the shrimp without mutilating the bodies thereof.

Another object is to provide an apparatus for automatically delivering shrimp to a deheading mechanism for removing the heads from the bodies prior to discharging the bodies into a container or onto a conveyor belt for further processing.

A further object is to provide an apparatus for deheading shrimp by pinching the heads thereof between two coacting rolls while urging the body of the shrimp away from the pinching rolls.

Another object is to provide for the deheading of shrimp without mutilating the bodies thereof by causing said bodies to be engaged by angularly disposed guide means to cause the bodies of the shrimp to move along the axis of a guide roll while the heads of the shrimp are being delivered to a pair of coacting rolls for pinching and severing said heads from the bodies and permitting the bodies to fall onto a delivery chute.

A still further object is to provide a method of deheading shrimp by causing the shrimp to adhere to a rotatable resilient roll for delivery to a pair of deheading rolls while urging the body of the shrimp away from the deheading rolls so that the shrimp body will not be drawn between said rolls and become mutilated as the heads are removed.

Other objects and advantages, more or less ancillary to the foregoing in the manner in which all of the various objects are realized, will appear in the following description which, when considered in connection with the accompanying drawings, sets forth the preferred embodiment of the invention.

Referring to the drawings, wherein the preferred embodiment of the invention is illustrated:

Figure 3:
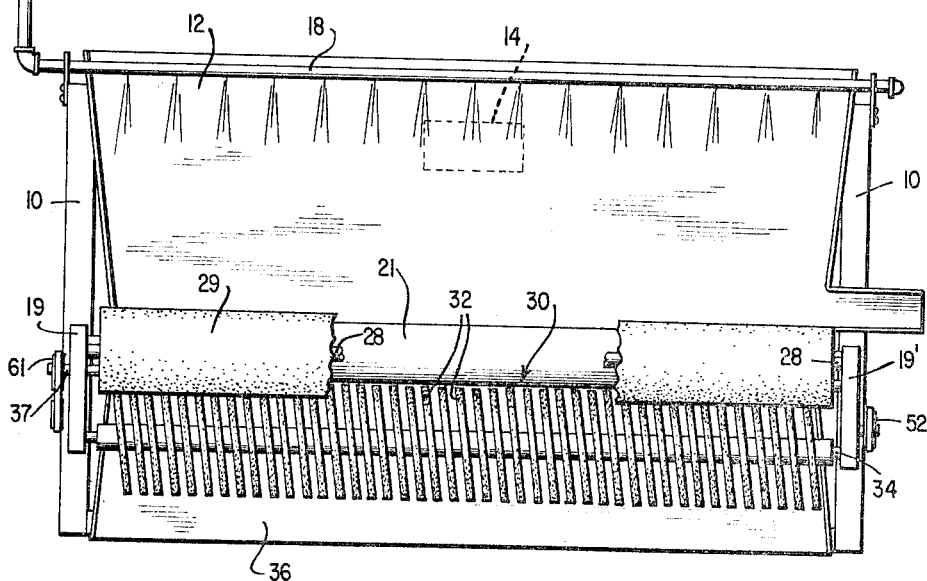
Figure 4:
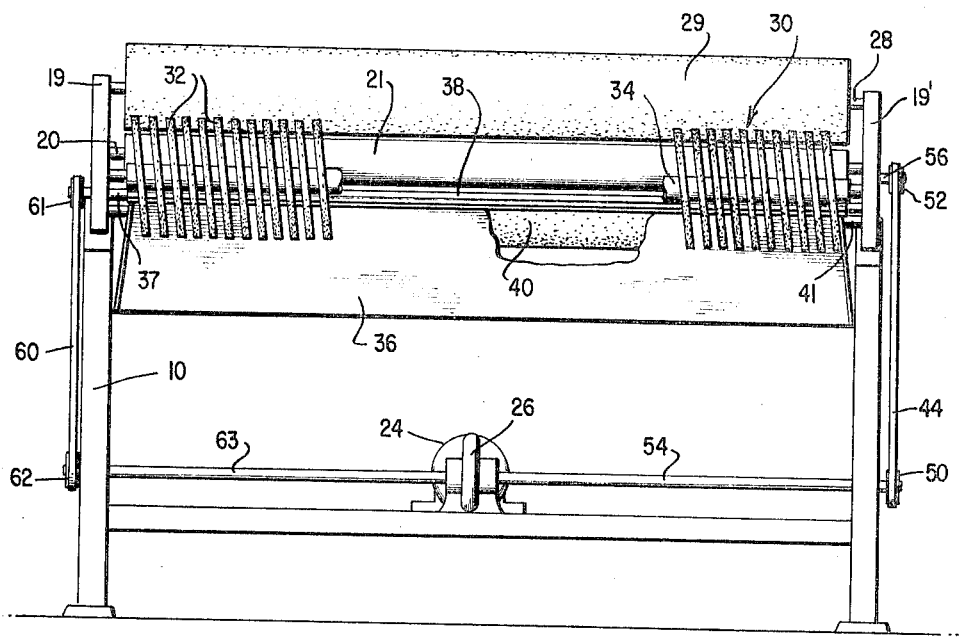

FIG. 3 is a partial top view of the apparatus showing the water spray pipe on the feeding trough and the arrangement of the alignment brushes in relation to the resilient roller; and FIG. 4 is a partial front elevation of the apparatus showing the driving means for rotating the various brushes and rollers of the deheading apparatus with certain portions having been broken off and parts omitted in the interest of clarity.

The shrimp deheading apparatus consists of an elongated member having a resilient surface, preferably a rotatable resilient roller or drum like member, and a coacting pinching roller, preferably having a plurality of circumferentially spaced ridges extending longitudinally along the periphery of the pinching roller. Such member and pinching roller are preferably employed in conjunction with a plurality of alignment devices which may be brushes spaced around the resilient roller. All of these elements are mounted on a suitable base. The ridges of the knurled roller engage or coact with the resilient roller to form a nip into which the heads of the shrimp are directed. When the knurled roller is rotated at a greater peripheral speed than is the resilient roller, the heads of the shrimp in being drawn between said rollers and severed from the body of the shrimp in a manner simulating the conventional and time honored manual deheading operation.

One of the alignment brushes is mounted on said base above the resilient roller for rotation movement with respect thereto and is spaced from said roller a distance that is approximately equal to the thickness of a shrimp body. Such an arrangement allows only a single shrimp to pass at any one point between the resilient roller and the alignment brush, so that the shrimp are prevented from stacking up in a plurality of layers on said resilient roller as they are received from a vibrating feeder pan or trough. The resilient roller is formed from an elastomeric material, such as rubber or a suitable plastic. The wet shrimp antenna tend to adhere to the surface of the roller and the shrimp are carried headfirst thereby into the nip formed by said roller and the knurls of the knurled roller.

Another alignment brush is arranged to coact with both the resilient roller and the knurled roller in effecting the removal of the heads from the bodies. This alignment brush is formed from a plurality of spaced apart brush wheels which are mounted upon a common shaft for rotation therewith. The various brush wheels are mounted in an inclined relation with respect to the axis of the shaft and it has been found that if the individual wheel brushes are offset approximately 7½ degrees from the normal with respect to the axis of the shaft that said brushes will engage and impart to the bodies of the shrimp a movement that is longitudinally of the resilient roller and along its peripheral surface towards one end of said roller.

The spacing or distance between adjacent brush wheels is approximately the width or thickness of a shrimp body so that upon the rotation of said brush wheels they engage the shrimp bodies on the resilient roller as the heads of the shrimp move into the nip between the resilient roller and knurled roller and thus impart a sidewise movement to the shrimp bodies causing the bodies to fall free from the rollers between the brush wheels onto a discharge chute as the heads of the shrimp are carried between said rollers. Thus the canted or offset wheel brushes act as camming members in engaging the bodies of the shrimp so that with the heads of the shrimp being acted upon by the resilient and knurled rollers the brush wheels engage the bodies of the shrimp and impart a movement thereto which is along the axis of the rollers whereby the bodies of the shrimp are removed from the head. This action also prevents the tails of the shrimp from engaging the resilient roller and knurled roller and from moving into and through the nip is formed by said rollers. The combined action of the several brushes results in an orderly arrangement and alignment of the shrimp along the surface of the resilient roller, insuring a low percentage of mutilation since the shrimp are prevented from becoming bunched in any one place and are thus correctly delivered to the deheading portion of the apparatus.

As the shrimp are carried by the resilient roller and into engagement with the alignment brushes, the shrimp antennas, which are approximately six to eight inches long, are drawn between the resilient roller and the knurled roller, while the shrimp bodies are still resting upon and supported by the upper surface of the resilient roller. The continued rotation of the rollers causes more of the antennas to be drawn therebetween so that the heads of the shrimp are gradually drawn into the nip of the rollers and finally between the rollers. As the heads of the shrimp enter the deheading mechanism the bodies of the shrimp are being moved in a sidewise manner along the peripheral surface of the resilient roller towards an end of said roller by the angularly offset wheel brushes of the alignment brush thus aiding in the severance of the shrimp head from the body. The rotation of the resilient roller and knurled roller in opposite directions and the fact that the knurled roller is rotating at a greater or higher peripheral speed than the resilient roller when combined with the movement imparted to the body of the shrimp by the brush wheels of the alignment brush tends to simulate the action imparted in the manual deheading of shrimp. That is, the forefinger is considered the moving member and would correspond to the knurled roller while the thumb would be regarded as being more stationary and corresponding to the resilient roller. Thus, in the manual deheading of shrimp, the forefinger and thumb impart a pushing and pulling action that is imparted or affixed to the shrimp head and body and this same general type of action is imparted to the head and body of the shrimp by the resilient roller and knurled roller rotating in opposite directions and at different peripheral speeds. In addition, the movement of the shrimp bodies by the wheel brushes in moving the bodies causes the body of the shrimp to be severed from the head and the point of severance is the weakest point of the shrimp.

The antennas and heads, upon being removed from the bodies, pass between the resilient roller and knurled roller and are subsequently removed from said rollers by any suitable means. A preferred manner of removing the detached antennas and heads and for cleaning the rollers is by a rotatable brush which is positioned to engage the surfaces of both the resilient roller and knurled roller.

Figure 2:
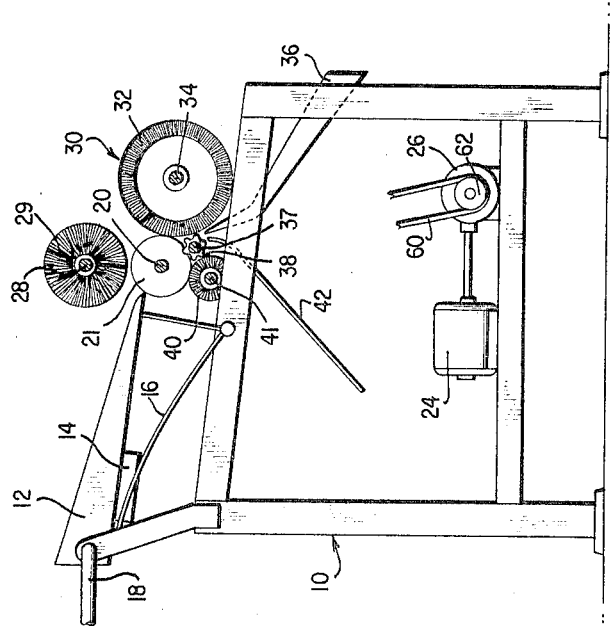
FIG. 2 is a side elevation on a reduced scale of the shrimp deheading apparatus showing the general arrangement of the parts including a portion of the driving means with certain parts having been omitted in the interest of clarity.
Figure 1:
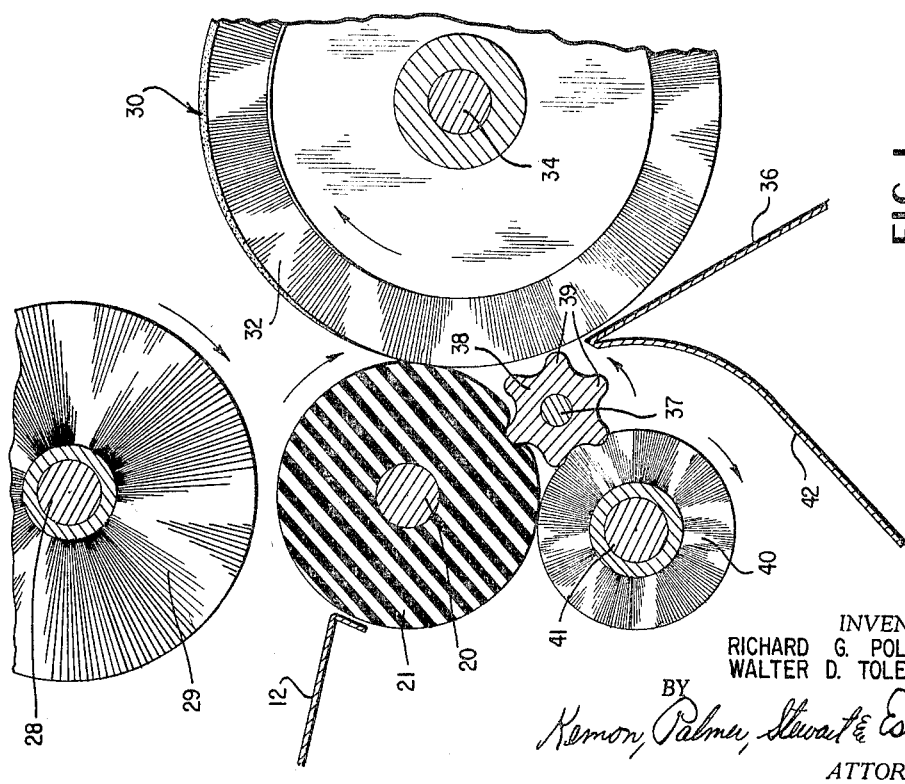
FIG. 1 is an enlarged sectional view of the deheading apparatus of the present invention showing the preferred arrangement and embodiment of the feeding trough, deheading rolls, alignment brushes, and discharge chute.

Referring now to the drawings, there is shown in FIG. 2 a base or stand 10, upon which the shrimp deheading apparatus is adapted to be mounted. The shrimp to be deheaded are delivered by any suitable means, not shown, to a feeder pan 12 that is supported on the base 10 and said pan is adapted to be actuated or moved by a vibrator 14 and a spring mounting 16. A perforated water pipe 18 is associated with the feeder pan 12 for delivering spaced jets of water over the surface of the pan to aid in advancing the shrimp toward the delivery end of the pan.

A pair of suitable gear housings 19 and 19', FIGS. 3 and 4, are mounted on the base 10 to support the hereinafter described rollers and brushes. The housings 19 and 19' support an axle 20 on which is mounted a resilient roller 21 that is rotatably driven through a conventional gear arrangement, not shown, within the housings 19 and 19'. The roller 20 may be fabricated from any suitable resilient material, such as rubber or plastic, so that the wet antenna of the shrimp will adhere with sufficient force to said roller and thus the shrimp will be removed from the feeder pan and gradually drawn onto the surface of the roller. The water from the pipe 18 wets the shrimp and flowing down the surface of the feeder pan also wets the surface of the roller 20.

The housings 19 and 19' also have mounted therein an axle 28 which carries a rotatable alignment brush 29. The axle 28 is so mounted within the gear housings that the brush 29 will be spaced from the resilient roller 21 a distance that is approximately equal to the thickness of a shrimp. This arrangement permits the brush 29 to align the shrimp along the surface of the roller 21 and prevent bunching of the shrimp at any given spot along the roller surface.

The housings 19 and 19' have mounted therein another shaft 34 which has secured thereon a number of brush wheels 32 to form a second alignment brush 30. The brush wheels 32 are mounted on the shaft 34 in an offset manner that is, the wheels 32 are secured to the shaft in angular relation thereto so that the wheels are in a plane that is about 7½ degrees off from the normal to the axis of rotation of said shaft. The brush wheels 32 are also spaced from one another along the shaft 34 a distance that is approximately equal to the width of a shrimp body, which causes the shrimp to become aligned along the surface of the resilient roller 21, while at the same time, imparting a sidewise movement to the shrimp as they are carried around by the resilient roller 21. Any number of brushes could be used to align the shrimp and the use of the two brushes 29 and 30 is by way of explanation only and is not intended to be limiting in the scope of the invention as disclosed.

A downwardly inclined discharge chute 36 is mounted on the base 10 beneath the resilient roller 21 and slightly to one side thereof to receive the bodies of the shrimp from the surface of the resilient roller.

The housings 19 and 19' also have mounted therein a shaft 37 that has secured thereon a knurled roller 38. The shaft 37 is so mounted in the housings 19 and 19' that the roller 38 is positioned beneath and slightly to one side of the axis of the resilient roller 21. The roller 38 is formed with a fluted or undulating surface to define circumferentially spaced ridges 39 which extend longitudinally along the periphery of the roller. The ridges 39 engage the peripheral surface of the roller 21 and provide with said roller a nip into which the antennas and heads of the shrimp are adapted to move. The shafts 20 and 37, which carry the rollers 21 and 38, are disposed in a common plane, that is, the axis of rotation of said rollers are in a plane that is approximately at an angle of 60° with respect to a horizontal plane or with respect to a horizontal plane through the axis of the brush 30.

A rotatable cleaning brush 40, mounted on a shaft 41 that is carried by the gear housings 19 and 19', is adapted to engage the surfaces of both the resilient roller 21 and the knurled or ridged roller 38 so as to remove the antennas and heads of the shrimp therefrom and discharge them along a chute 42 mounted on the base 10 beneath the brush 40. The resilient roller 21 and the alignment and cleaning brushes 29, 30 and 40, are driven by a motor 24 and gear reduction box 26 through a suitable belt 44, which is entrained over pulleys 50 and 52, affixed to the ends of shafts 54 and 56, respectively. The shaft 56 drives a conventional gear system, not shown, within the housing 19' which in turn drives the axles 28, 34, 41 and 20 through suitable gears, not shown, affixed to the ends of various shafts and axles. The motor 24 and gear reduction box 26 also drive the knurled roller 38 through a belt 60 entrained over pulleys 61 and 62 attached to the ends of shafts 37 and 63. The brushes 29, 30 and 40 and resilient roller 21 are rotated in one direction by the motor, belts and gear system contained in housing 19', while the knurled roller 38 is rotated in the opposite direction.

In operation, the shrimp are delivered to the pan 12 which is actuated by the vibrator 14 to move the shrimp over the surface of the pan 12 and into engagement with the resilient roller 21. The shrimp antenna being wet as a result of the water spray on the pan 12 tend to adhere to the resilient roller 21 and upon the rotation of the roller the shrimp are caused to move headfirst with the roller. The brushes 29 and 30 align the shrimp along the surface of the resilient roller and keep the shrimp from becoming bunched in any one spot and in addition, brush 30 imparts a sidewise movement to the shrimp bodies on the roller surface.

The knurled roller 38 coacts with the resilient roller 21 to form a nip into which the antennas of the shrimp are drawn by the opposite rotation of the rollers. As more of the antennas and finally the heads of the shrimp are drawn into the nip of the coacting rollers 21 and 38, the heads and antennas are effectively pinched and removed from the bodies and the bodies are then delivered to the discharge chute 36.

Although the foregoing description is necessarily of a detailed character, in order that the invention may be completely set forth, it is to be understood that the specific terminology is not intended to be restrictive or confining, and that various rearrangements of parts and modifications of details may be resorted to without departing from the scope or spirit of the invention hereinafter claimed.

What is claimed is:

1. Apparatus for deheading shrimp comprising, a base, an inclined pan mounted on said base for receiving shrimp, a resilient member rotatably mounted on said base adjacent the said pan, for receiving said shrimp, a plurality of brushes rotatably mounted on said base adjacent said resilient member; a knurled member rotatably mounted on said base in an engaging relationship with said resilient member, means for moving said shrimp from said pan onto said resilient member and into engagement with said knurled member, means for rotating said resilient member, said brushes and said knurled member for deheading said shrimp, discharge means for the separated heads and bodies of the shrimp.

2. Apparatus for deheading shrimp comprising, a base means, an inclined pan mounted on said base to receive shrimp to be deheaded, vibratory means mounted on said pan, a resilient roller rotatably mounted on said base adjacent said pan for receiving and conveying said shrimp from said pan, a first alignment brush rotatably mounted on said base adjacent said resilient roller and spaced therefrom a distance whereby only a single shrimp can pass between said first brush and said resilient roller, a second alignment brush rotatably mounted on said base abutting said resilient roller, said second brush formed from a plurality of spaced apart brush wheels disposed in angular relationship to said resilient roller whereby the shrimp are caused to pass between said brush wheels and have a movement imparted thereto along the surface of said resilient roller toward an end thereof, a knurled roller mounted on said base in coacting relationship with said resilient roller whereby the antenna and head of the shrimp become engaged between said rollers and are removed from the shrimp body contemporaneous with the movement of the shrimp along said resilient roller, by said brush wheels, a cleaning brush rotatably mounted on said base in an abutting relationship with said resilient roller and said knurled roller, means to spray water onto said feeder pan and said discharge chute, means to rotate said resilient roller, said first alignment brush, said second alignment brush and said cleaning brush in a first direction, and means to rotate said knurled roller in an opposite direction.

3. Apparatus for deheading shrimp comprising a base member, an inclined pan mounted on said base to receive the shrimp to be deheaded, a resilient roller rotatably mounted on said base adjacent said pan for receiving said shrimp from said pan, a first alignment brush rotatably mounted on said base in a spaced relationship to said resilient roller, a second alignment brush rotatably mounted on said base abutting said resilient roller, a knurled roller rotatably mounted on said base engaging said resilient roller for removing the heads and antennas from the shrimp bodies, means for rotating said resilient member, said first brush, said second brush and said knurled roller and, discharge means for separated shrimp bodies and heads.

4. Apparatus for deheading shrimp comprising, a base member, an inclined pan mounted on said base to receive the shrimp to be deheaded, a resilient roller rotatably mounted on said base adjacent said pan for receiving said shrimp, said resilient roller being adapted to have the shrimp adhere to the surface thereof for movement therewith, at least two brushes rotatably mounted on said base adjacent said resilient roller, one of said brushes being spaced from said resilient roller whereby only a single shrimp can pass between said brush and said roller, another of said brushes abutting said resilient roller, said abutting brush formed from a plurality of spaced apart brush wheels arranged in angular relation to the surface of said roller to guide shrimp therebetween while imparting a movement to said shrimp along the surface of said roller towards an end thereof, a knurled roller rotatably mounted on said base in coacting relationship with said resilient roller to engage the heads of the shrimp for severing the heads from the bodies of the shrimp contemporaneous with the movement imparted to the bodies of the shrimp by said brush wheels; a discharge chute mounted on said base adjacent said resilient roller to receive the shrimp bodies; means on said base to rotate said resilient roller and said brushes in one direction and said knurled roller in the opposite direction, and; means to remove the antennas and head from said resilient roller and said knurled roller.

5. Apparatus for deheading shrimp comprising a horizontally disposed base member, an elongated elastomeric roller mounted on said base, means supported on said base for delivering shrimp to the peripheral surface of said roller, a knurled roller mounted on said base in coacting relationship with said elastomeric roller, the axis of said rollers being arranged in a common plane that is inclined with respect to said base member, a rotatable member mounted on said base adjacent said rollers for guiding the heads of the shrimp between said rollers, the peripheral surface of said rotatable member being configured to engage and move the bodies of said shrimp in a direction along the longitudinal axis of said rollers contemporaneous with the engagement of the heads of the shrimp by said rollers for removing the heads of the shrimp from the bodies, and means on said base for driving said rollers in opposite directions.

6. Apparatus for deheading shrimp comprising a horizontally disposed base member, an elongated elastomeric roller mounted on said base, means supported on said base for delivering shrimp to the peripheral surface of said roller, a knurled roller mounted on said base in coacting relationship with said elastomeric roller, the axis of said rollers being arranged in a common plane that is inclined with respect to said base member, an alignment brush rotatably mounted on said base superjacent said elastomeric roller to arrange and position shrimp upon the peripheral surface of said elastomeric roller, a rotatable member mounted on said base adjacent said rollers for guiding the shrimp with the heads thereof moving between said rollers, the peripheral surface of said rotatable member being configured to engage and move the bodies of said shrimp along the peripheral surface of said elastomeric roller in a direction parallel to the axis of said rollers contemporaneous with the engagement of the heads of the shrimp by said rollers for removing the heads from the bodies of the shrimp, driving means on said base for rotating said elastomeric roller, alignment brush and rotatable member, said driving means connected to said knurled roller for rotating said knurled roller in a direction counter to said elastomeric roller and with the peripheral speed of said knurled roller being greater than the speed of said elastomeric roller.

7. An apparatus for deheading shrimp as set forth in claim 6 wherein said rotatable member comprises a plurality of brush wheels mounted on a shaft, said brush wheels being disposed in a plane inclined with respect to the axis of said shaft and spaced from one another a distance sufficient to receive a shrimp for guiding and moving same over the periphery of the elastomeric roller.

8. The process of deheading shrimp comprising, delivering the shrimp to a rotatable resilient member, causing the shrimp to adhere to the peripheral surface of said resilient member, distributing and aligning the shrimp evenly over the peripheral surface of said resilient member, moving said shrimp along the surface of said resilient member towards an end thereof, while rotating said resilient member to deliver the heads of the shrimp to a rotatable member coacting with said resilient member, causing said rotatable member to move in a direction counter to the direction of movement of said resilient member to remove the heads from said shrimp received therebetween contemporaneous with the movement of the shrimp along the surface of said resilient member.

9. An apparatus for deheading shrimp which comprises a base, a movable member supported on said base and having a resilient surface, a pinching roller defining a plurality of circumferentially spaced ridges extending longitudinally on the periphery of said roller, said roller being rotatably supported on said base in coacting relation with said resilient surface to define a nip between said member and said roller for receiving shrimp head first thereby pinching the head from said shrimp, driving means supported on said base to operate said roller and said member, and means supported by said base to align said shrimp transverse to said nip.

10. An apparatus as recited in claim 9 wherein said driving means comprises means to rotate said roller at a peripheral speed greater than the speed of said surface.

11. An apparatus as recited in claim 9 wherein said movable member comprises a roller.

12. An apparatus for deheading shrimp which comprises a base, a movable member supported on said base and having a resilient surface, a pinching roller rotatably supported on said base in coacting relation with said resilient surface to define a nip between said member and said roller for receiving shrimp headfirst thereby pinching the head from said shrimp, and means supported by said base adjacent said nip to engage and move the bodies of the shrimp axially relative to said pinching roller while the heads of the shrimp are engaged by said roller.

13. An apparatus as recited in claim 12 wherein said shrimp moving means comprises rotary means having axially spaced brushes inclined relative to the movement of said surface.

14. An apparatus for deheading shrimp which comprises a base, roller supported on said base and having a soft resilient surface, a pinching roller having a hard non-resilient surface rotatably supported on said base in co-acting relation with said resilient surface to define a nip between said rollers for receiving shrimp headfirst thereby pinching the head from said shrimp, said first named roller having a substantially greater diameter than said pinching roller, driving means supported on said base to operate said rollers so that said co-acting resilient and non-resilient surfaces move in the same direction past said nip, and means supported by said base to align said shrimp transverse to said nip.

15. An apparatus as recited in claim 14 wherein said pinching roller defines a plurality of circumferentially spaced ridges extending longitudinally on the periphery of said roller.

16. An apparatus as recited in claim 14 and further comprising means adjacent said nip to engage said shrimp and move their bodies axially relative to said pinching roller while the heads of the shrimp are engaged by said pinching roller.

17. An apparatus for deheading shrimp which comprises a base, a movable member supported on said base and having a soft resilient surface, a pinching roller having a hard non-resilient surface rotatably supported on said base in coacting relation with said resilient surface to define a nip between said member and said roller for receiving shrimp headfirst thereby pinching the head from said shrimp, said pinching roller defining a plurality of circumferentially spaced ridges extending longitudinally on the periphery of said roller, driving means supported on said base to operate said roller and said member so that said coacting resilient and non resilient surfaces move in the same direction past said nip, and means supported by said base to align said shrimp transverse to said nip.

18. An apparatus as recited in claim 17 wherein said driving means comprises means to rotate said roller at a peripheral speed greater than the speed of said surface.

19. An apparatus as recited in claim 17 further comprising means to supply water to wet the shrimp to cause the shrimp to adhere to said resilient surface thereby causing the shrimp to be conveyed headfirst by said surface toward said nip.

References Cited by the Examiner

UNITED STATES PATENTS

| | | | |
|---|---|---|---|
| 2,663,900 | 12/1953 | Greiner et al. | 17—45 |
| 2,785,435 | 3/1957 | Lapeyre et al. | 17—2 |
| 2,958,896 | 11/1960 | Merrick | 17—2 |
| 3,020,583 | 2/1962 | Lapeyre et al. | 17—2 |

SAMUEL KOREN, *Primary Examiner.*

L. H. LAUDENSLAGER, *Examiner.*